W. A. WARMAN.
PHOTOGRAPHIC CAMERA.
APPLICATION FILED JULY 24, 1913.
1,146,293.
Patented July 13, 1915.
4 SHEETS—SHEET 1.
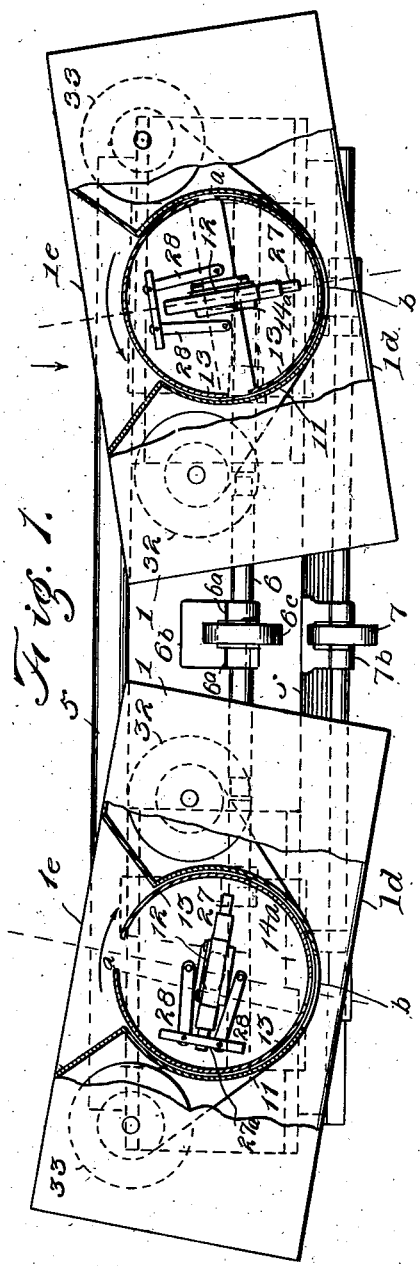
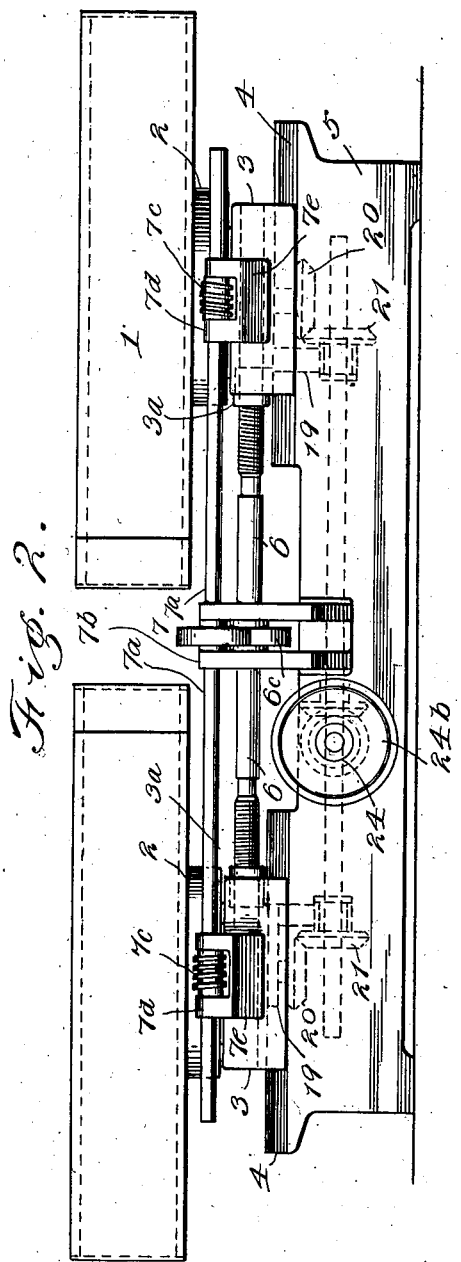
Witnesses
Inventor
William A. Warman
By W. A. Redmond
Attorneys

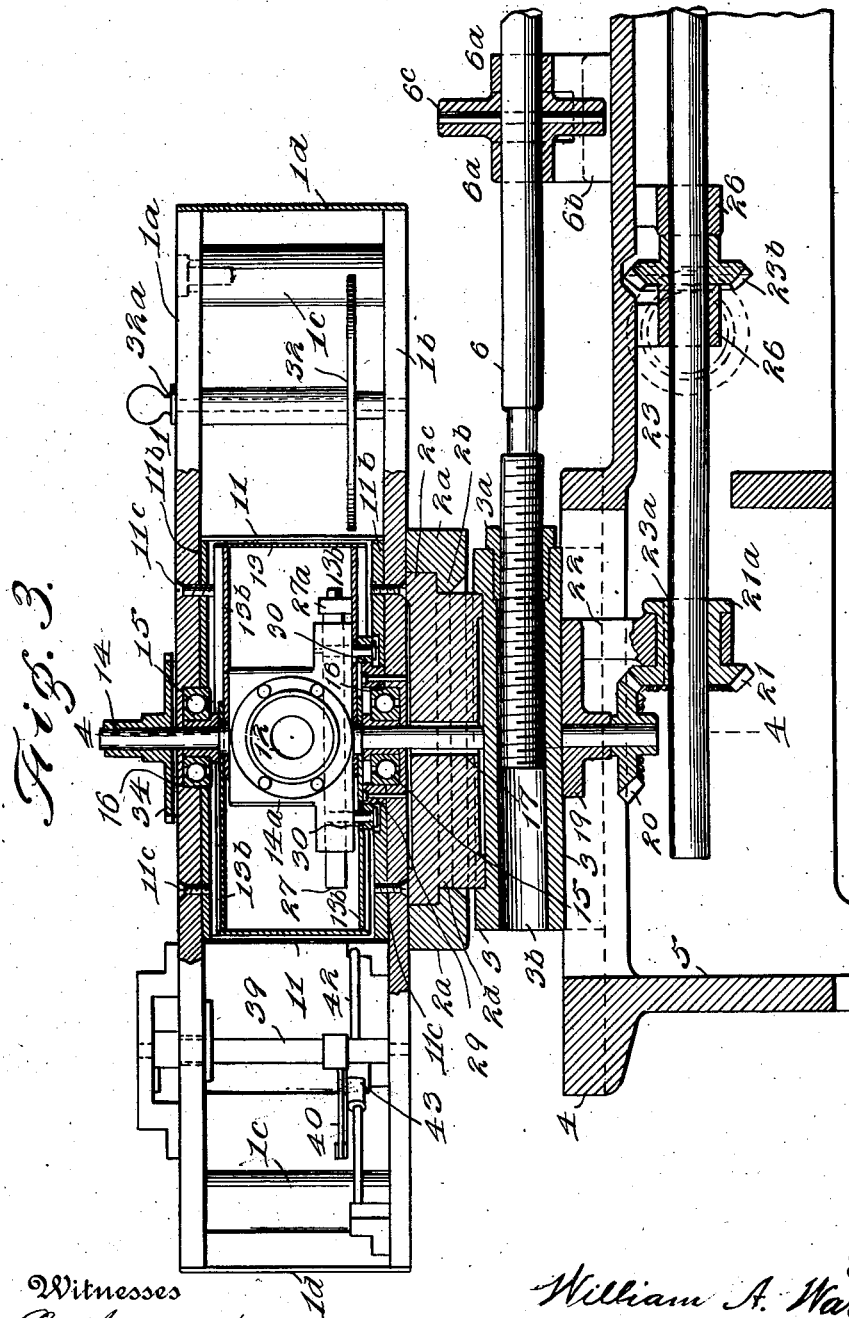

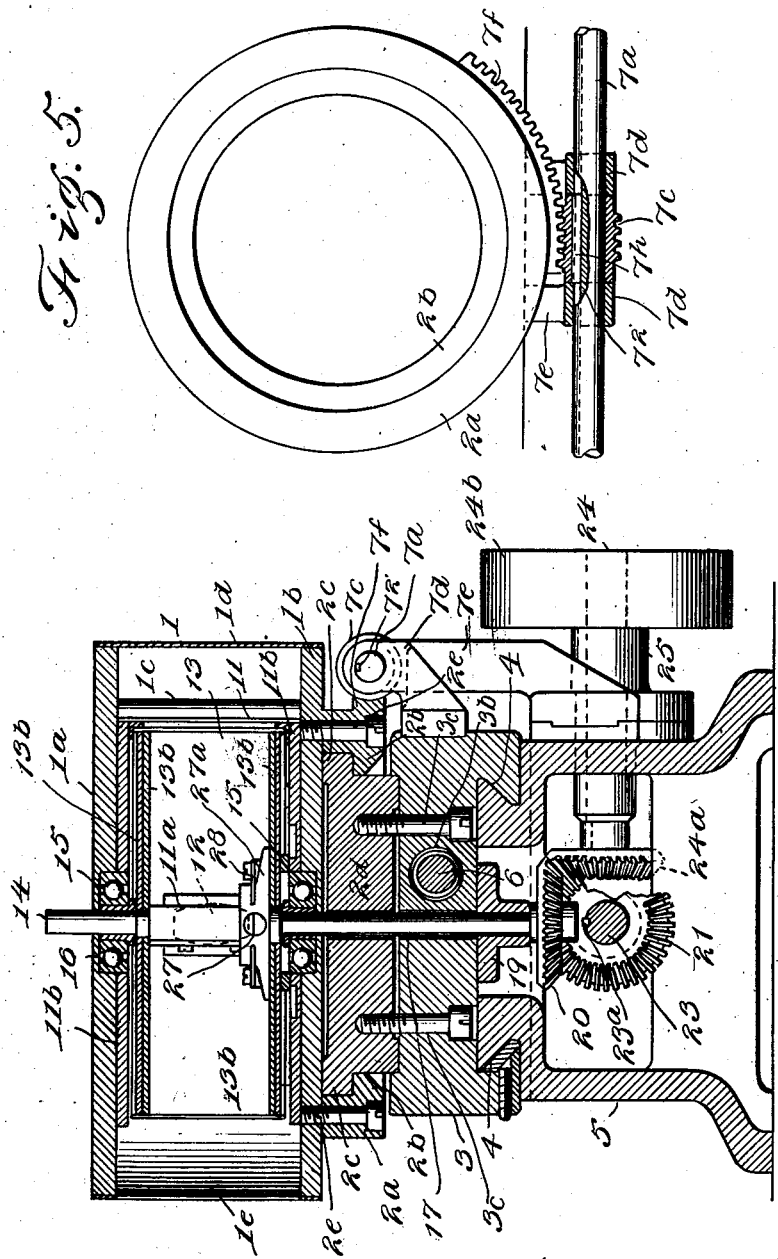

W. A. WARMAN.
PHOTOGRAPHIC CAMERA.
APPLICATION FILED JULY 24, 1913.
1,146,293.
Patented July 13, 1915.
4 SHEETS—SHEET 4.
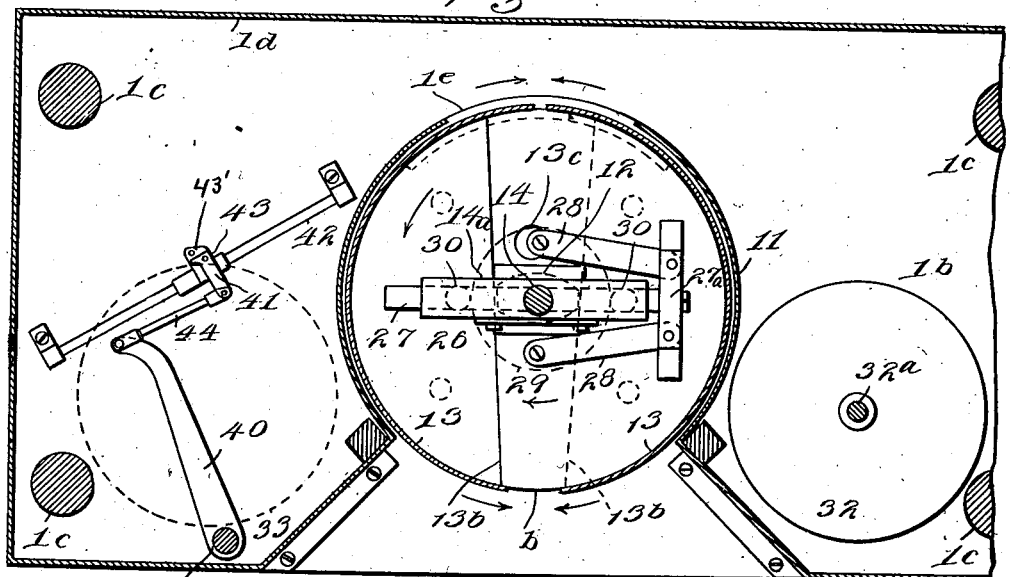
Fig. 6.
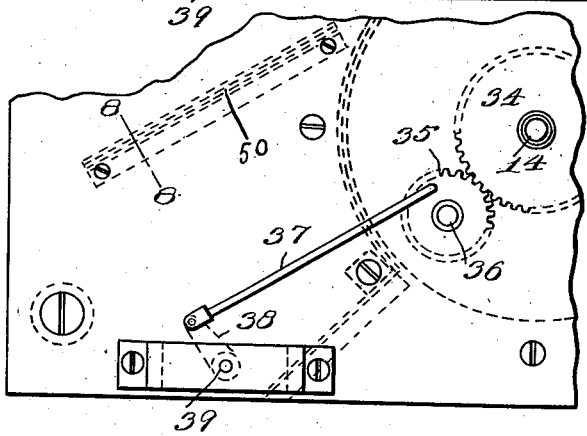
Fig. 7.
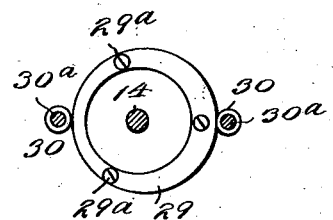
Fig. 8.
Fig. 9.
Witnesses
O. M. Jamieson
Ethel Bailey
Inventor
William A. Warman
By W. A. Redmond
Attorneys

UNITED STATES PATENT OFFICE.

WILLIAM A. WARMAN, OF BROOKLYN, NEW YORK.

PHOTOGRAPHIC CAMERA.

1,146,293.  Specification of Letters Patent.  Patented July 13, 1915.

Application filed July 24, 1913. Serial No. 781,008.

*To all whom it may concern:*

Be it known that I, WILLIAM A. WARMAN, a citizen of the United States, residing at Brooklyn, in the county of Kings and State of New York, have invented a certain new and useful Improvement in Photographic Cameras, of which the following is a specification.

This invention relates to photographic cameras and it has for its object to provide an apparatus adapted to photograph moving objects in such manner as to produce a stereoscopic effect in the resulting projected pictures.

The mechanism disclosed in the following specification by which this object is attained comprises two cameras mounted to allow of sufficient separation to give the desired stereoscopic effect, means whereby the cameras may be convergently focused upon a common object, and mechanism whereby the said cameras may be automatically actuated to expose sensitive surfaces to obtain a series of pictures of said common object from two points of view.

The invention consists in the novel construction of the cameras, the mechanism by which they are adjusted as to distance and focused upon a common point, the mechanism for operating the cameras to make exposures, the construction and arrangement of the shutter and the means for operating the same, and generally in the details of construction and arrangement of parts set forth in the following description and specifically pointed out in the claims.

In the accompanying drawings, Figure 1 is a top plan view of a complete machine constructed in accordance with my invention parts of the camera cases being removed to show the interior parts. Fig. 2 is a rear elevation of the machine, showing the adjusting mechanism by which the cameras are actuated. Fig. 3 is a longitudinal vertical section, on an enlarged scale, through one end of the machine, and looking in the direction of the arrow, Fig. 1. Fig. 4 is a cross section on the line 4—4, Fig. 3, on a correspondingly enlarged scale. Fig. 5 is a detached view of the worm and gear for converging one of the camera cases. Fig. 6 is a plan view of one of the camera cases with the top removed. Fig. 7 is a plan view showing the actuating means for operating the film feeding device illustrated in the preceding figure. Fig. 8 is a detail in vertical section of a form of film guide, and Fig. 9 is a detail in plan view of the shutter actuating cam and rollers.

Similar numerals refer to similar parts throughout all the views.

In the drawings 1 1 are camera carriers seated on turntables 2 2, secured to slides 3 3 arranged to be moved along dovetailed ways 4 formed on the upper surface of a base 5. The camera carriers are rectangular in shape and comprise top and bottom plates $1^a$ $1^b$, intermediate posts $1^c$, and inclosing walls $1^d$. At one side the cases are provided with angular openings $1^e$ through which the exposures are made, the center of each opening corresponding with a line drawn diametrically through the center of the respective lens as shown in Fig. 1. The lower plates $1^b$ of the camera carriers are secured by screws $2^c$ to rings $2^a$, as shown in Fig. 4, said rings being provided with annular lips $2^b$ adapted to engage under similar lips $2^c$ on circular plates $2^d$ secured by screws $3^c$ to the top of the slides 3, the rings $2^a$ and plates $2^d$ forming the two members of the turntables 2 by which the camera carriers are supported and may be adjusted.

The slides 3 are movable longitudinally along the ways 4 and are moved thereon by a shaft 6 supported at a central point in bearings $6^a$ formed in a split bracket $6^b$ secured to the base 5. Between the two members of the bracket $6^b$ a hand wheel $6^c$ is secured to the shaft 6. The outer ends of the shaft 6 are provided with right and left threads adapted to engage nuts $3^a$ secured within longitudinal openings $3^b$ in the slides 3. The construction and arrangement of the parts is such that revolution of the hand wheel and shaft in one direction will cause an equal separating movement of the two slides 3, while an opposite movement of the hand wheel and shaft will bring the two slides closer together.

The camera carriers are given a partial revolution about their centers to cause them to converge or focus to a common center by a hand-wheel 7 mounted centrally on a longitudinal shaft $7^a$ and secured against endwise movement by a double bearing $7^b$. The outer ends of the shaft $7^a$ are provided with worms $7^c$ mounted on said shaft and held between bearings $7^d$ $7^d$ carried by brackets $7^e$ secured to the slides 3. The worms $7^c$ are provided with keys $7^h$ adapted to slide in longitudinal keyways $7^i$ in the shaft $7^a$, and are moved along the shaft by the action of the slides 3.

The worms 7ᶜ engage in segmental racks 7ᶠ formed on the outer surface of the rings 2ᵃ, and are arranged with oppositely disposed threads, the relative arrangement of the parts being such that rotation of the shaft 7ᵃ in one direction will increase the angular relation between the two cameras, while movement in the opposite direction will decrease said angular relation.

Each of the camera carriers 1 sustains a centrally located camera, comprising a casing 11, a lens 12, a shutter 13, and means for operating the shutter, as will be more fully described. The casings 11 are cylindrical in shape and are composed of the side walls and upper and lower heads 11ᵇ attached by screws 11ᶜ, Fig. 3, to the top and bottom plates of the camera carriers and holding the cylindrical cases in position. The casings 11 are cut away at their forward sides, as at $a$, where, they face the angular openings 1ᶜ to permit exposures to be made, and have a portion of the rear walls removed, as at $b$, to permit these exposures to pass to the films, as will be presently described.

Centrally located vertical shafts 14 are mounted in bearings 15 seated in recesses 16 in the top and bottom heads 11ᵇ and the upper and lower plates of the carrier 1. These shafts 14 pass through central openings 17 in the turntables 2 and have their bearings in brackets 19, attached to the slides 3 and have attached bevel gears 20 intermeshing with similar bevel gears 21 carried in depending brackets 22 secured to the under side of the slides 3 and held therein by collars 21ᵃ. The gears 21 are arranged to slide longitudinally on a countershaft 23 underlying the base 5 and are provided with keys 23ᵃ adapted to slide in key-ways in said shaft in such manner as to permit longitudinal movement of the slide 3 and the parts mounted thereon, and to retain driving connection with said shaft.

The countershaft 23 is driven by a short power shaft 24 mounted in bearings 25 in the base 5, and geared to the countershaft 23 by a bevel gear 24ᵃ on the inner end of said shaft 24, and a corresponding gear 23ᵇ secured to the countershaft 23 and held between brackets 26 depending from the base 5 in such manner as to prevent end play of the countershaft 23. The outer end of the power shaft is provided with a driving wheel 24ᵇ and may be driven from any preferred source of power capable of imparting the necessary speed to the moving parts.

The vertical shafts 14 are provided with lens carriers 14ᵃ sustaining the lenses 12 in the optical centers of the cameras. The lenses are symmetrical and are preferably geared to maintain a relation of 90 degrees to each other when rotating in order that the interval between exposures may be infinitely small. By this arrangement one camera is exposing while the film is being shifted in the other.

Within the casing 11 and pivoted to the shafts 14 are mounted shutters, each shutter comprising two approximately semicircular members 13 movable relatively to each other and controlled in such movement by a shutter actuating mechanism comprising a sliding bolt 27, link connections 28, a cross head 27ᵃ, an operating cam 29, and bolt actuating rollers 30.

The shutters 13 are formed with approximately semicylindrical walls fitted closely within the casing 11 and are sustained by overlapping heads 13ᵇ pivotally mounted on the shafts 14, and are arranged to present an opening at the front of the camera when exposure is being made, and a coincident narrow slit in front of the exposed film or surface.

Two exposures are made with each revolution of the shutter and lens, in which the relative position of the parts of the shutter are changed, the openings alternating in position. As the forward opening through which the exposure is made is preferably wider than that in front of the film, the shutters are arranged to be shifted in relation to each other to increase the forward opening and correspondingly decrease the rearward openings by the actuating mechanism.

The bolts 27 are mounted to slide in the lens carriers 14ᵃ and are provided at one end with a cross-head 27ᵃ to which the link connections 28 are pivoted, one on each side of the sliding bolts 27. The other ends of the links 28 are attached, one to each member of the shutter 13, the points of attachment being on opposite sides of the pivotal points of said members, one of the lower heads 13ᵇ being formed with an openin 13ᶜ for the passage of the pivot screw of one of the links 28. See Fig. 6. Underlying the shutters and concentrically mounted as to the central shafts 14 are the cams 29. These cams are provided with a very gradual rise and are adapted to actuate the bolt 27 by means of rollers 30 mounted on pins 30ᵃ carried one at each end of the bolt 27, and in normal close contact with the periphery of the cam.

The cam is fixed to the bottom of the camera casing by screws 29ᵃ and the rollers revolve with the shutters and sliding bolt 27. As will be seen, the result of this arrangement is to vibrate the two members of the shutter while the parts are in revolution around the central shaft 14, and thereby open and close the two slits. The cams are preferably arranged to obtain the maximum opening in front and the minimum in the rear of the camera, but this can be varied by changing the position of the cams.

The films to be exposed are presented to the cameras by intermittently moving mechanism controlled in its action by the shafts 14, this mechanism comprising storage rolls 32, receiving rolls 33, and actuating mechanism 34.

The storage rolls 32 are mounted vertically between the top and bottom plates of the carriers 1, and are preferably in the form of open spools, and removably mounted on spindles 32ª adapted to be inserted in bearings in the said plates. The films pass from the storage rolls around the rear side of the cylindrical casing 11 and from this point to the receiving rolls 33 of similar construction to the rolls 32.

While the films may be moved by any well known means, I prefer to drive them by an intermittent feed mechanism, as shown in Fig. 7, constructed as follows: Above the carriers 1 the shafts 14 are provided with gears 34, intermeshing with pinions 35 mounted on spindles 36 secured to said carriers 1. The pinions are connected by pitmen 37 with arms 38 mounted on rock-shafts 39 extending through the carriers 1 and provided with vibrating arms 40 which control slides 41 mounted on bearing rods 42 and arranged to travel thereon a distance equivalent to the length of film to be shifted with one exposure. The slides 41 are provided with clamping members 43 actuated by the intermediate connecting links 44, said clamping members 43 being arranged to catch the edge of the films against stop 43' when the parts are moving in one direction and to release the film on the opposite direction of travel.

For the purpose of sustaining the films and preventing them from being injured or torn I prefer to sustain their edges between vertical guide plates 50 as shown in Fig. 8.

The action of the mechanism is as follows: The two cameras are converged or focused to the desired point by the operation of the shaft 7ª, and separated the desired distance by the operation of the shaft 6. Power is then applied to the shaft 24 and the shaft 23 rotated by the gears 24ª, and 23ᵇ, thereby rotating the gears 21 and 20 and thus imparting motion to the shaft 14 and revolving the camera shutters and lenses at any desired speed. Each camera will make two exposures at each revolution and each shutter relatively opened and closed twice in the same time. As the cameras are arranged at 90 degrees to each other this will result in four pictures at each complete revolution, two from each point of view.

Having thus described my invention what I claim is:

1. A plurality of cameras, means for simultaneously focusing them upon a common point, and mechanism operating said cameras to periodically expose a sensitized film.

2. A plurality of cameras, means for simultaneously focusing said cameras upon a common point, and mechanism for operating said cameras to obtain photographic exposures from two or more separated points of view.

3. A plurality of cameras, means for separating the same for a predetermined distance, mechanism for convergently focusing said cameras upon a common object, and mechanism whereby said cameras are operated to periodically expose sensitized films to obtain a series of pictures from points of view determined by said separating means.

4. In a photographic apparatus of the kind described, two cameras, a sustaining base, mechanism carried thereby by which the distance between said cameras may be varied, means for directing said cameras to a common point, and power operating mechanism, whereby the films are periodically exposed in said cameras to obtain a series of pictures from two points of view determined by separating mechanism and said directing means.

5. In an apparatus of the kind described, two cameras, shutters for said cameras, a supporting base and means carried by said base for determining the relative separation of said cameras and mechanism by which they may be directed to a common point, lenses mounted in said cameras, power driven means for revolving said lenses, mechanism operated by the revolution of said lenses whereby the shutters are actuated to continuously and periodically expose films to obtain a series of pictures from points of view determined by the separation of said cameras, and means actuated by said power devices whereby said film is moved between said exposures.

6. In an apparatus of the kind described, camera carriers, turntables on which said carriers are secured, mechanism by which the turntables and attached carriers may be rotated, slides upon which said turntables are mounted, a base upon which said slides move, mechanism for operating said slides to vary the distance between said turntables, and cameras mounted in said carriers.

7. In a camera, a cylindrical shell having an opening for admitting light, and an opening to permit exposure of a film, a shutter arranged in said camera, a lens carrier centrally located in said cylindrical shell, a lens carried thereby, mechanism for rotating the lens carrier and means controlled by such rotation whereby said shutter is operated to control the admission of light and the amount of exposure.

8. In a camera of the kind described, a camera carrier, a cylindrical camera mounted therein, said camera being provided with openings for the admission of light and the exposure of a film, a lens carrier mounted centrally in said camera, a lens carried thereby, a cylindrical shutter interposed between said lens and the walls of said camera, said shutter having openings whereby light is admitted and exposure made, and power means for operating and revolving said lens and shutter and controlling thereby the amount of light admission and film exposure.

9. In a mechanism of the kind described, two camera carriers, means for determining their relative distance and direction, cylindrical cameras located in said carriers, lenses centrally situated in said cameras, shutters, each comprising two semicylindrical parts, pivotally mounted in said cameras and interposed between the lenses and the walls of said cameras, means for revolving said lens carriers and said shutters, mechanism controlled by said revolution whereby the spaces between the two part shutters are varied to control the light admission and exposure, and power means for operating the carriers alternately to expose a film, whereby four pictures are obtained for each complete revolution of the two cameras.

10. In an apparatus of the kind described, camera carriers, cylindrical cameras mounted therein, said carriers and cameras being formed with corresponding openings for the admission of light and the exposure of films, lenses, carriers for said lenses arranged centrally in said cameras, two part shutters interposed between said lenses and the walls of said cameras, power mechanism for revolving said carriers, and mechanism operated by the revolution of said lens carriers for simultaneously revolving said shutters and varying the relative position of the two parts to increase and diminish the openings between the same and control the light admission and exposure.

11. In a camera, a cylindrical casing provided with openings for the admission of light and the exposure of a film, a symmetrical lens located centrally of said casing, a revolving carrier in which said lens is secured, a revolving shutter interposed between said lens and the walls of said casing, means for simultaneously actuating said lens and shutter to obtain an exposure, and mechanism driven by said actuating means for moving the film to position for a new exposure.

In testimony whereof, I affix my signature, in the presence of two witnesses.

WILLIAM A. WARMAN.

Witnesses:
L. ANSTIE,
F. DREYFUS.